(12) United States Patent
Schwab

(10) Patent No.: US 6,705,813 B2
(45) Date of Patent: Mar. 16, 2004

(54) SNAP DISC DEVICE

(76) Inventor: Pierre P. Schwab, 1768 SE. Clearmont St., Port St. Lucie, FL (US) 34983

( * ) Notice: Subject to any disclaimer, the term of this patent is extended or adjusted under 35 U.S.C. 154(b) by 162 days.

(21) Appl. No.: 10/067,603

(22) Filed: Feb. 7, 2002

(65) Prior Publication Data

US 2003/0147723 A1 Aug. 7, 2003

(51) Int. Cl.$^7$ .................. F16B 21/18; F16B 39/24
(52) U.S. Cl. .................. 411/526; 411/156; 411/544
(58) Field of Search ................. 411/521, 525, 411/526, 520, 516, 544, 155, 156; 267/159

(56) References Cited

U.S. PATENT DOCUMENTS

| | | | |
|---|---|---|---|
| 2,275,058 A | * | 3/1942 | Draving |
| 2,361,193 A | | 10/1944 | Gray |
| 2,368,193 A | | 1/1945 | Boynton |
| 2,516,236 A | | 7/1950 | Moorhead et al. |
| 2,624,819 A | | 1/1953 | Spina et al. |
| 2,629,791 A | | 2/1953 | Tourneau |
| 2,753,544 A | | 7/1956 | Cox et al. |
| 3,027,609 A | * | 4/1962 | Parkin |
| 3,464,308 A | * | 9/1969 | Dohmeier |
| 3,909,768 A | | 9/1975 | Woods |
| 4,751,351 A | | 6/1988 | Lambke |
| 4,760,221 A | | 7/1988 | Yoshida et al. |
| 4,822,959 A | | 4/1989 | Schwab |
| 5,149,150 A | | 9/1992 | Davis |
| 5,269,499 A | | 12/1993 | Schwab |
| 5,496,142 A | * | 3/1996 | Fodor |
| 6,082,943 A | * | 7/2000 | Schneider |

* cited by examiner

Primary Examiner—Flemming Saether
(74) Attorney, Agent, or Firm—Robert J. Harter

(57) ABSTRACT

A bowed snap-disc includes inner and outer perimeters that provide the disc with operating characteristics not found in comparably sized discs. At certain points along its circumference, the inner perimeter extends farther from the disc's center than certain other points of the disc's outer perimeter. This provides the disc with a unique combination of spring constant, compressive force, deflection and coefficient of compliance. The disc is particularly useful as a small, flat compression spring; a shaft or bar locking element; tightness indicator for a threaded fastener; or a lock washer.

8 Claims, 6 Drawing Sheets

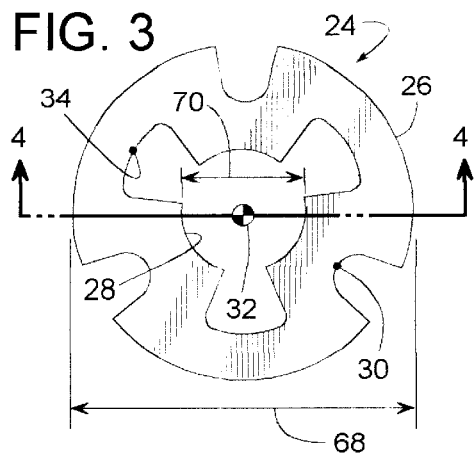
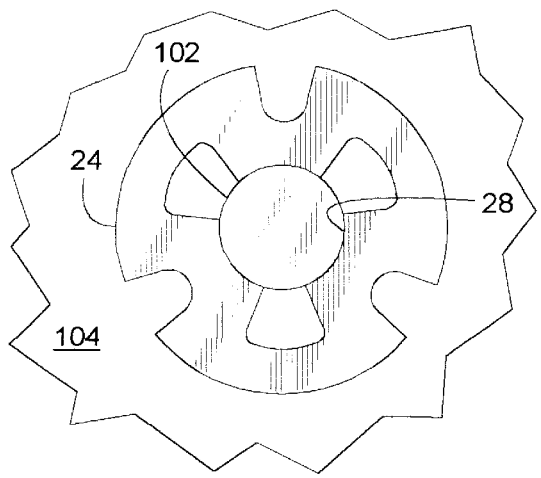
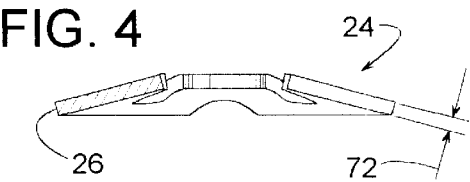
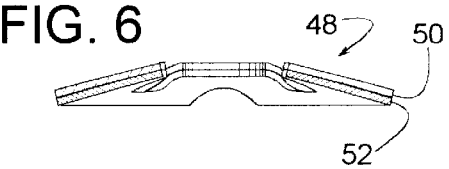
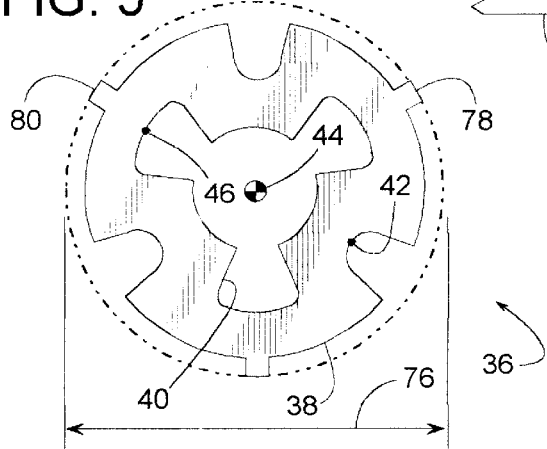
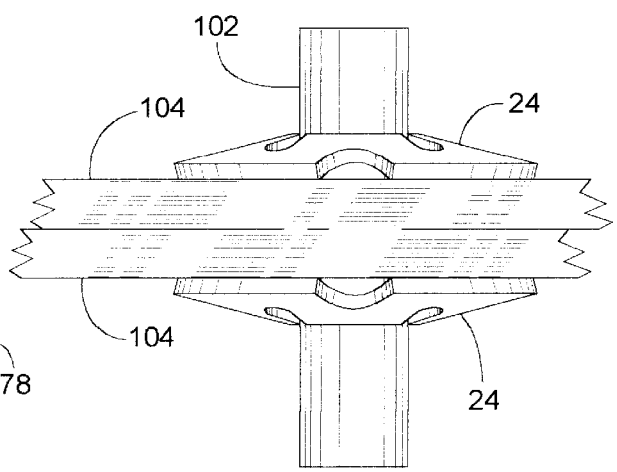

FIG. 7

| Device | OD (in) | ID (in) | T (mils) | F (lbs) @75% defl | Defl (in) @75% defl | SR (lbs/in) @75% defl | CC |
|---|---|---|---|---|---|---|---|
| SD1 | 0.400 | 0.156 | 11 | 10.4 | 0.022 | 608 | 13.7 |
| SD2 | 0.560 | 0.200 | 15 | 31.5 | 0.034 | 925 | 11.6 |
| SD3 | 0.714 | 0.255 | 15 | 20.2 | 0.041 | 493 | 13.4 |
| SD4 | 0.896 | 0.032 | 25 | 102.2 | 0.053 | 1928 | 10.3 |
| SD avg | | | | | | | 12.3 |
| | | | | | | | |
| B1 | 0.394 | 0.205 | 10 | 14.0 | 0.009 | 1555 | 4.0 |
| B2 | 0.551 | 0.283 | 14 | 29.0 | 0.013 | 2230 | 4.1 |
| B3 | 0.709 | 0.244 | 16 | 33.0 | 0.018 | 1833 | 4.4 |
| B4 | 0.886 | 0.441 | 24 | 100.0 | 0.024 | 4167 | 4.2 |
| B avg | | | | | | | 4.2 |
| | | | | | | | |
| C1 | 0.430 | 0.200 | 11 | 6.0 | 0.014 | 428 | 17.0 |
| C2 | 0.551 | 0.265 | 15 | 9.3 | 0.018 | 517 | 22.0 |
| C3 | 0.735 | 0.395 | 16 | 9.1 | 0.028 | 325 | 23.0 |
| C4 | 0.980 | 0.525 | 18 | 11.9 | 0.045 | 264 | 23.0 |
| C avg | | | | | | | 21.3 |
| | | | | | | | |
| W1 | 0.367 | 0.265 | 6 | 4.7 | 0.010 | 490 | 3.0 |
| W2 | 0.618 | 0.440 | 8 | 5.6 | 0.013 | 431 | 3.0 |
| W3 | 0.734 | 0.531 | 9 | 6.7 | 0.016 | 419 | 3.0 |
| W4 | 0.925 | 0.719 | 10 | 5.4 | 0.022 | 245 | 5.0 |
| W avg | | | | | | | 3.5 |
| | | | | | | | |
| F1 | 0.595 | 0.312 | 10 | 7.0 | 0.021 | 333 | 8.5 |
| F2 | 0.728 | 0.344 | 8 | 6.0 | 0.057 | 105 | 3.9 |
| F3 | 0.926 | 0.344 | 10 | 25.0 | 0.053 | 472 | 2.0 |
| F avg | | | | | | | 4.8 |

SNAP DISC DEVICE

BACKGROUND OF THE INVENTION

1. Field of the Invention

The subject invention generally pertains to a snap disc device, and more specifically pertains a snap disc device whose particular geometry provides exceptional operating characteristics.

2. Description of Related Art

The use of conventional compression springs can be limited by their physical size, as such springs are usually much longer than other types of springs. So, in applications where space is limited, other types of springs are often used, such as Bellville washers, curved disc springs, wave disc springs, and finger disc springs.

Belleville washers are resiliently compressible conical washers that provide a spring effect. For a given length, Belleville washers typically have much higher spring rates and significantly less travel than compression springs. This limits the use of Bellville washers to applications requiring relatively high forces and little travel. Belleville washers can be stacked back-to-back to provide lower spring rates and more travel, but a stack of washers will of course consume more space.

Curved disc springs have the shape of a flat washer that has been bent or bowed about a line parallel to the face of the washer. For a given size, a single curved disc springs may provide a lower spring rate than that of a Bellville washer. However, stacking curved disc springs to achieve even lower spring rates can be difficult to accomplish. Stacking the springs peak-to-peak is difficult to maintain, as the discs are normally free to rotate to a more stable arrangement of peak-to-valley.

Wave disc springs are similar to curved disc springs, but with more bends to create a wavy shape. Just as with curved disc springs, it can be difficult to maintain a stack of wave disc springs in a peak-to-peak arrangement. For a given size, wave disc springs tend to have less travel than curved disc springs.

Finger disc springs comprise an annular disc whose outer perimeter includes several fingers that are bent out of coplanar alignment with the rest of the disc. The fingers can resiliently deflect to create a spring-like effect. The fingers, however, may also interfere with being able to effectively stack finger disc springs with predictable results.

The physical structure of conventional disc springs limits their application. Current disc springs have limited use as springs and are not readily adapted for other uses such as gripping a square key.

Snap disc devices, invented by Pierre Schwab and disclosed in U.S. Pat. Nos. 4,822,959 and 5,269,499 have clover leaf shapes to create a bi-stable snap-action. However, the physical structure, operating characteristics, and/or method of pre-stressing such snap discs limits their usefulness.

SUMMARY OF THE INVENTION

To overcome the limitations of current disc springs and snap disc devices, an object of some embodiments of the invention is to provide an elastic disc that serves as a fastener by gripping the four sides of a square shaft.

Another object of some embodiments of the invention is to provide a fastener with a particular disc geometry that provides the fastener with a surprisingly high coefficient of compliance, and yet the fastener is readily stackable to lower or increase its spring rate.

Another object of some embodiments is to provide a fastener with a threaded member, wherein the fastener indicates the degree of tightness to which the threaded member compresses a bowed disc a predetermined amount of deflection against a standoff element.

Another object of some embodiments is to provide a disc-like fastener that helps inhibit a threaded fastener from unscrewing under vibration.

Another object of some embodiments is to provide a fastener with a threaded member, wherein the fastener indicates the degree of tightness to which the threaded member compresses a bowed disc a predetermined amount of deflection against a standoff element, and wherein the standoff element is a simple unitary ring.

Another object of some embodiments of the invention is to provide a fastener with a particular disc geometry that provides the fastener with a lower spring rate and more travel than a Belleville washer of similar material, thickness and diameter.

Another object of some embodiments of the invention is to provide a fastener with a particular disc geometry that provides the fastener with a higher coefficient of compliance than a Belleville washer of similar material, thickness and diameter.

Another object of some embodiments of the invention is to provide a fastener with a particular disc geometry that provides the fastener with spring characteristics that are generally between that of a Belleville washer and a compression spring.

Another object of the invention is to provide a cloverleaf shaped disc having a bowed shaped when it its normally unstressed position.

Another object of some embodiments is to provide a cloverleaf disc with radial protrusions around its outer perimeter that provide the disc with more freedom to deflect.

Another object is to provide a disc fastener that is radially symmetrical so it can be installed alone or in a stacked arrangement regardless of its rotational orientation.

Another object of some embodiments is to provide a disc fastener with ample travel and a significant spring rate even though the disk has a rather large diameter to thickness ratio.

Another object of some embodiments is to provide a disc fastener whose material thickness is less than 5% of its diameter, thereby making the disc especially useful where axial space is limited.

These and other objects of the invention are provided by a disc fastener having an outer edge and an inner edge, wherein portions of the inner edge extend radially further out than some portions of the outer edge. The disc's geometry provides a coefficient of compliance greater than 10, wherein the coefficient of compliance is defined as the disc's thickness cubed divided by a product of the disc's spring constant at 75% compression times the disc's effective outer diameter squared, wherein the thickness is expressed in mils, the spring constant is expressed in pounds per inch and the effective outer diameter is expressed in inches.

BRIEF DESCRIPTION OF THE DRAWINGS

FIG. 3 is similar to FIG. 1, but of another embodiment.

FIG. 4 is a cross-sectional view taken along line 4—4 of FIG. 3.

FIG. 5 is similar to FIGS. 1 and 3, but of yet another embodiment.

FIG. 6 is similar to FIG. 4, but of another embodiment.

FIG. 7 is a chart comparing various characteristics of the present invention, Bellville washers, curved washers, wave washers and finger washers.

FIG. 8 is similar to FIG. 3, but showing the disc gripping a round rod.

FIG. 9 is a front view of FIG. 8.

DESCRIPTION OF THE PREFERRED EMBODIMENTS

Figure 1:
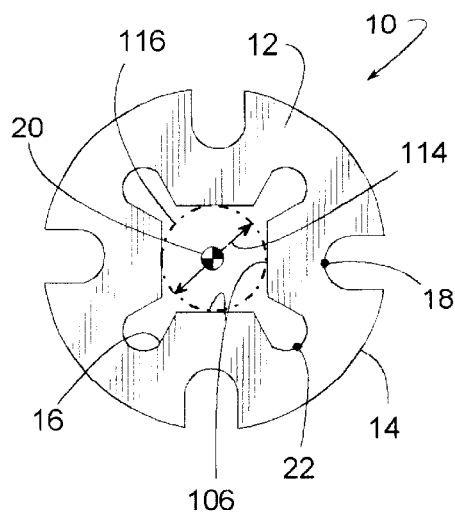
FIG. 1 is a top view of a disc fastener according to one embodiment of the invention.
Figure 10:
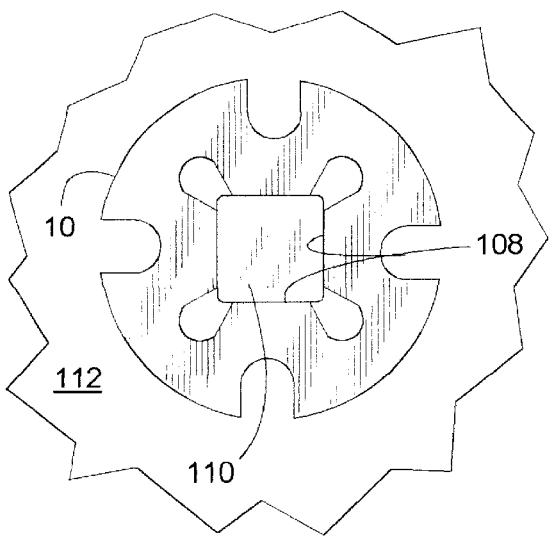
FIG. 10 is similar to FIG. 8, but showing the disc of FIG. 1 gripping a square bar.
Figure 2:
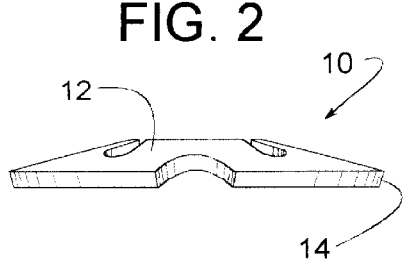
FIG. 2 is a side view of the disc in FIG. 1.
Figure 11:
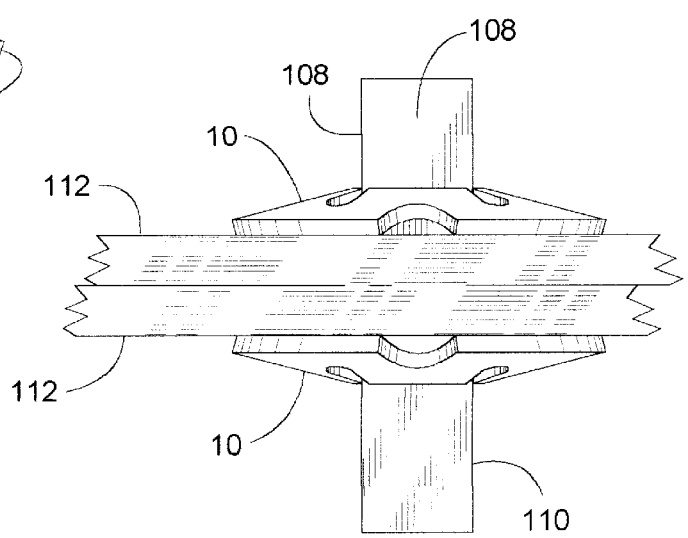
FIG. 11 is a front view of FIG. 10.

A fastener shown in FIGS. 1 and 2 includes a disc 10 with various design features that provide the fastener with the versatility to perform a variety of functions. Disc 10 (as shown or with some modification) can selectively serve as a variety devices including, but not limited to, a compression spring, a shaft or bar locking element, or tightness indicator for a threaded fastener.

Figure 15:
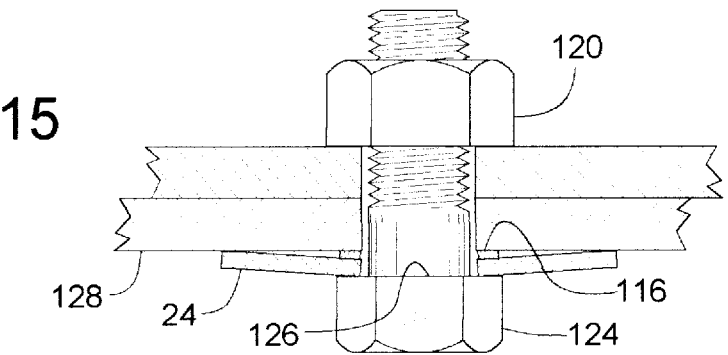
FIG. 15 is similar to FIG. 14, but with the disc at another position.
Figure 16:
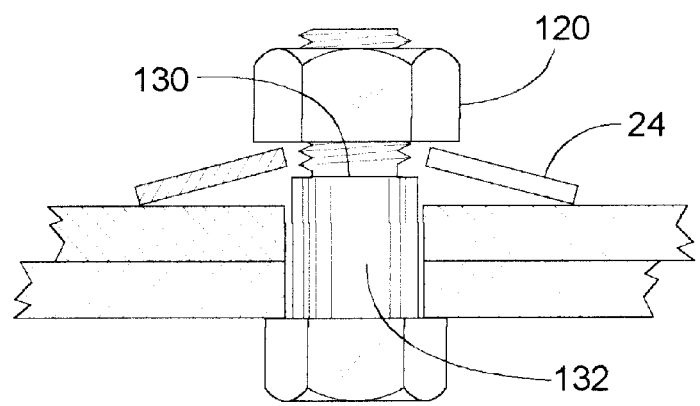
FIG. 16 is similar to FIG. 13, but of another embodiment.
Figure 17:
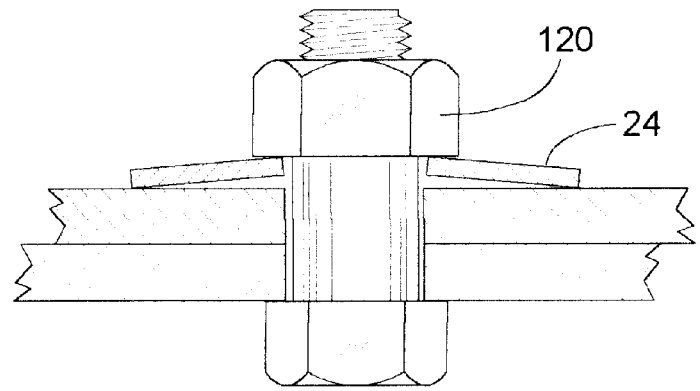
FIG. 17 is similar to FIG. 16, but with the disc compressed 75%.
Figure 18:
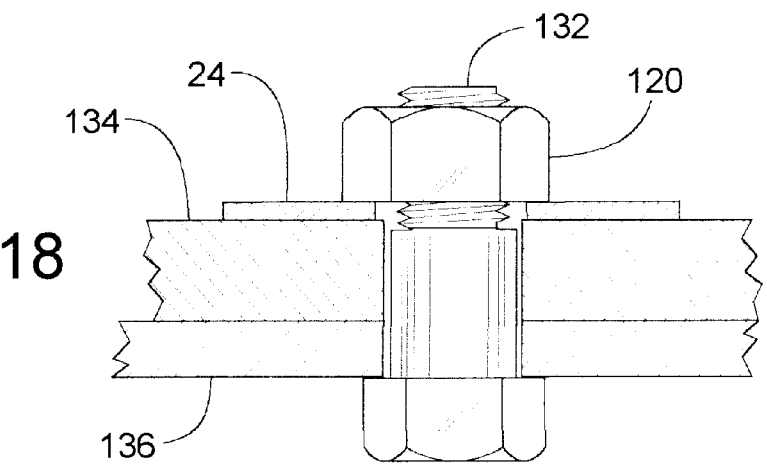
FIG. 18 is similar to FIG. 17, but with the disc compressed 100%.

Disc 10 is preformed so that its face surface 12 assumes a bowed or conical shape when in its unstressed position of zero percent (i.e., the disc's natural relaxed state, as shown by various discs in FIGS. 1, 2, 3, 4, 5, 12, 13 and 16). A fully stressed position of 100% is where a disc is completely flattened out, as shown in FIG. 18. An intermediate position is when a disc is compressed to a position between its unstressed position of zero percent and its fully stressed position of 100%. For example, FIGS. 14, 15 and 17 show a disc compressed to an intermediate position of 75%, wherein the disc has been compressed 75% of its fill travel distance toward its fully stressed position of 100% (e.g., if the disc's fill travel is 0.100 inches, the disc is compressed 0.075 inches to reach an intermediate position of 75%).

Referring to FIGS. 1 and 2, disc 10 includes a curved outer edge 14 and an inner edge 16. A minimum radial point 18 on outer edge 14 is at least as close to the disc's center of gravity 20 as is a maximum radial point 22 on inner edge 16. In some embodiments, minimum radial point 18 is preferably closer to the disc's center of gravity 20 than is maximum radial point 22 on inner edge 16. Likewise, disc 24 of FIGS. 3 and 4 includes a curved outer edge 26 and an inner edge 28. A minimum radial point 30 on outer edge 26 is at least as close to the disc's center of gravity 32 as is a maximum radial point 34 on inner edge 28. Referring to FIG. 5, disc 36 also includes a curved outer edge 38 and an inner edge 40. A minimum radial point 42 on outer edge 38 is closer to the disc's center of gravity 44 than is a maximum radial point 46 on inner edge 40.

Discs 10, 24 and 36 can be made of a variety of materials including, but not limited to carbon steel alloys, stainless steel alloys, copper alloys, inconel, monel, plastics and temperature responsive materials. Disc 48 of FIG. 6, for example, is made of bimetal where two intimately joined layers of material 50 and 52 have different coefficients of thermal expansion, so that disc 48 deflects as its temperature changes. Such a disc may be useful as a temperature sensor.

To create operating characteristics not available with existing fasteners, discs 10, 24 and 36 are provided with a thickness 54, an effective outer diameter 56, an effective inner diameter 58, and a 75% compression stroke 60 that produces a coefficient of compliance 62 in the range of ten to fifteen with an unusual spring rate 64 (i.e., axial compression force 66 divided by deflection 60, as shown in FIG. 7. Such characteristics can be achieved when the disc is made of an iron or iron alloy (e.g., steel, stainless steel, etc.) having a tensile strength of 60 to 250 psi and/or a modulus of elasticity of $25 \times 10^6$ to $35 \times 10^6$ psi. Disc 24 of FIGS. 3 and 4, for example, has an outer diameter 68 of 0.400 inches, an inner diameter 70 of 0.156 inches, a material thickness 72 of 11 mils (i.e., 0.011 inches), and a 75% deflection stroke of 0.022 inches when subjected to a compressive force of 10.4 pounds, thereby providing disc 24 with a coefficient of compliance of 13.7 ($13.7 = 11^3/(608 \times 0.4^2)$). The "coefficient of compliance" pertains to a spring's degree of compliance and is defined herein as a ratio of a disc's thickness cubed (in units of cubic mils) divided by the product of the disc's effective diameter squared (in units of square inches) times the disc's spring constant (in units of pounds-force per inch of compression at the disc's intermediate position of 75%).

The "effective diameter" of a disc is defined as the diameter of the smallest circle in which the outer edge of the disc can be inscribed. Disc 24 has an effective diameter 68, as shown in FIG. 3, and disc 36 has an effective diameter 76, as shown in FIG. 5. Disc 36 includes a plurality of protrusions 78 extending radially outward from the disc's outer edge 38, whereby a distal edge 80 of each protrusion 78 defines effective diameter 76. Protrusions 78 provide disc 36 with discrete points of contact around the disc's outer perimeter. In some applications, such points of contact allow disc 36 to flex more freely without inhibiting the disc's outer perimeter from flexing.

Returning back to the chart of FIG. 7, various embodiments of the current invention, e.g., discs 10, 24, 36 and another similar disc 82, have operating characteristics that are not available with other comparably sized devices. For example, an average coefficient of compliance 84 of discs 10, 24, 36 and 82 is 12.3 with a range of 10.3 to 13.7. Similar embodiments can provide a coefficient of compliance ranging from 10 to 15. However, some Bellville washers 86 may provide an average coefficient of compliance 88 of 4.2 with a range of 4.0 to 4.4; some curved washers 90 may provide an average coefficient of compliance 92 of 21.3 with a range of 17 to 23; some wave washers 94 may provide an average coefficient of compliance 96 of 3.5 with a range of 3 to 5, and some finger washers 98 may provide an average coefficient of compliance 100 of 4.8 with a range of 2 to 8.5.

Besides the coefficient of compliance, other characteristics of discs 10, 24, 36 and 82 distinguish them from comparably sized Bellville washers, curved washers, wave washers and finger washers. Generally speaking, discs 10, 24, 36 and 82 have significantly greater deflection than Bellville washers 86, they have a much lower spring rate than Bellville washers 86, they resist a greater force of deflection than curved washers 90, they have greater deflection than wave washers 94, and they have a higher spring rate than finger washers 98. It should be noted that FIG. 7 is for general comparison purposes wherein discs 10, 24, 36, 82, 86, 90, 94 and 98 are of a generally similar material, i.e., made of an iron or iron alloy, and/or made of a material having a tensile strength of 60 to 250 psi and/or a modulus of elasticity of $25 \times 10^6$ to $35 \times 10^6$ psi.

Such unique operating characteristics enable various embodiments of the invention to perform functions that are not readily achieved by other known devices. For instance, disc 24 can serve as an effective rod-clamping device, as shown in FIGS. 8 and 9. Here, disc 24 can be forced over a generally smooth round rod 102, so inner edge 28 of disc 24 can grip rod 102 without rod 102 having to include an additional holding feature, such as a groove or shoulder. Two discs 24 facing in opposite directions can hold one or more members 104 at a generally fixed location along rod 102.

In another embodiment, similar to disc 24, disc 10 is provided with an inner edge 16 having four linear edges 106 that are able to grip four faces 108 of a square bar 110, as shown in FIGS. 1, 2, 10 and 11. Two opposite facing discs 10 gripping bar 110 are able to hold bar 110 fixed relative to one or more members 112. Disc 10, in this case, has an inner diameter 114 defined by the largest circle 116 that can be inscribed within the inner edge 16 of disc 10.

Figure 12:
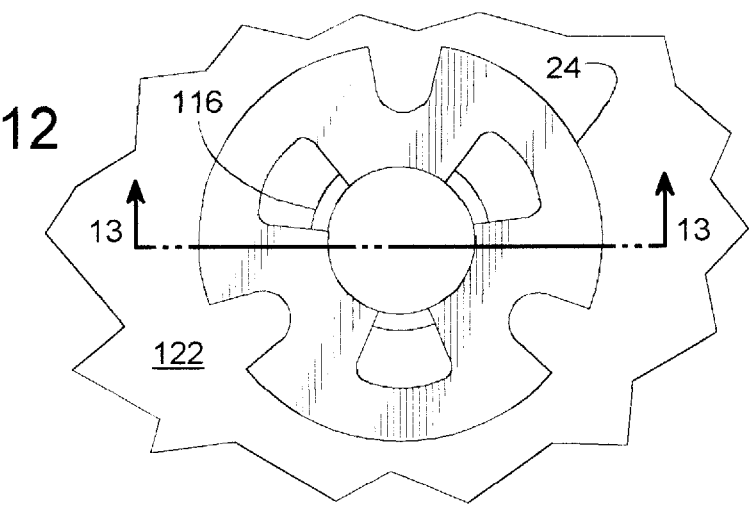
FIG. 12 is a top view of another embodiment.
Figure 13:
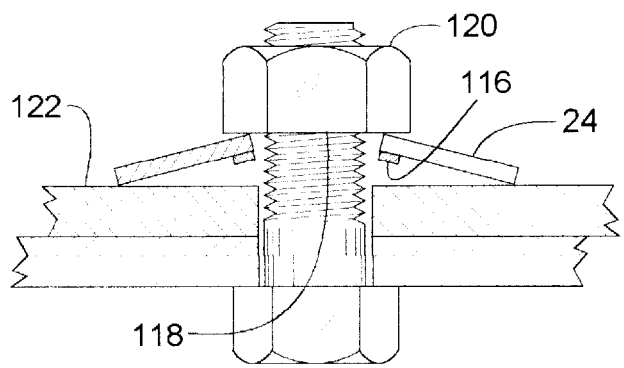
FIG. 13 is a cross-sectional view taken along line 13—13 of FIG. 12.
Figure 14:
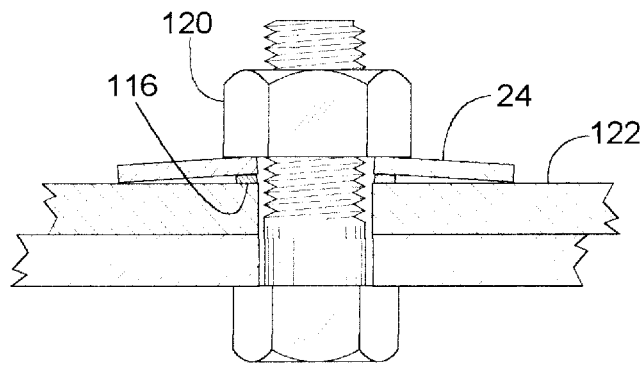
FIG. 14 is similar to FIG. 13, but with the disc compressed 75%.

Referring to FIGS. 12–14, in some cases, a standoff element, such as a ring 116, may be attached or simply placed adjacent to disc 24 to inhibit the disc from deflecting completely to its fully stressed or flat position. Here, disc 24 can be compressed between a first surface 118 (e.g., underneath an internally threaded member, such as a nut 120) and a second surface 122, thereby compressing disc 24 from its unstressed position of FIG. 13 to an intermediate position of FIG. 14. Alternatively, disc 24 may be compressed between a first surface 126 (underneath the head of an externally threaded member, such as a bolt 124, screw, etc.) and a second surface 128.

In some cases, the standoff element can be an integral part of the threaded member that compresses the disc. In FIGS. 16 and 17, for example, a shoulder 130 on threaded member 132 provides a standoff that inhibits disc 24 from being compressed beyond its intermediate position of FIG. 17. Once nut 120 is tightened against shoulder 130, further compression of disc 24 is inhibited. Of course, if shoulder 130 does not extend beyond the total thickness of members 134 and 136, then disc 24 could be compressed to its fully stressed position of 100%, as shown in FIG. 18.

Figure 19:
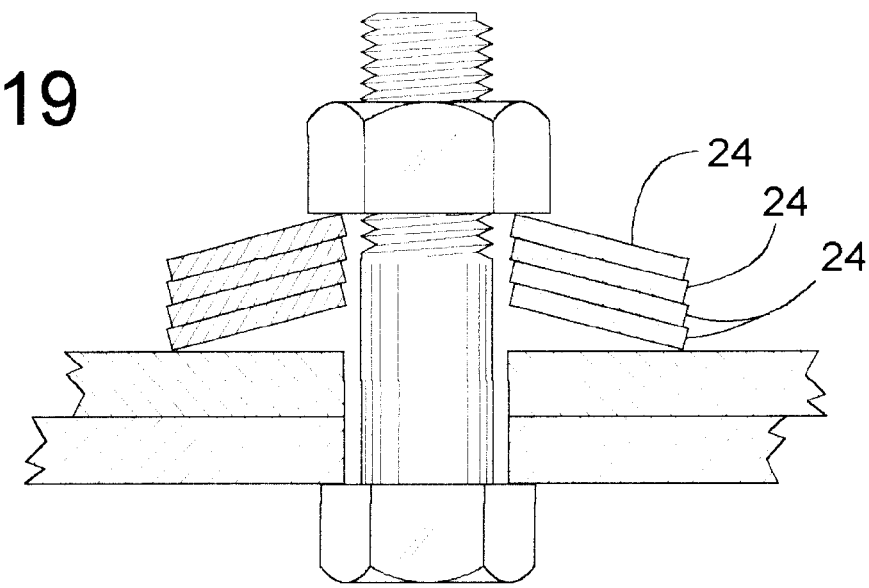
FIG. 19 is similar to FIG. 16, but showing a different threaded fastener and showing a set of discs stacked in such a way as to provide a greater spring rate.
Figure 20:
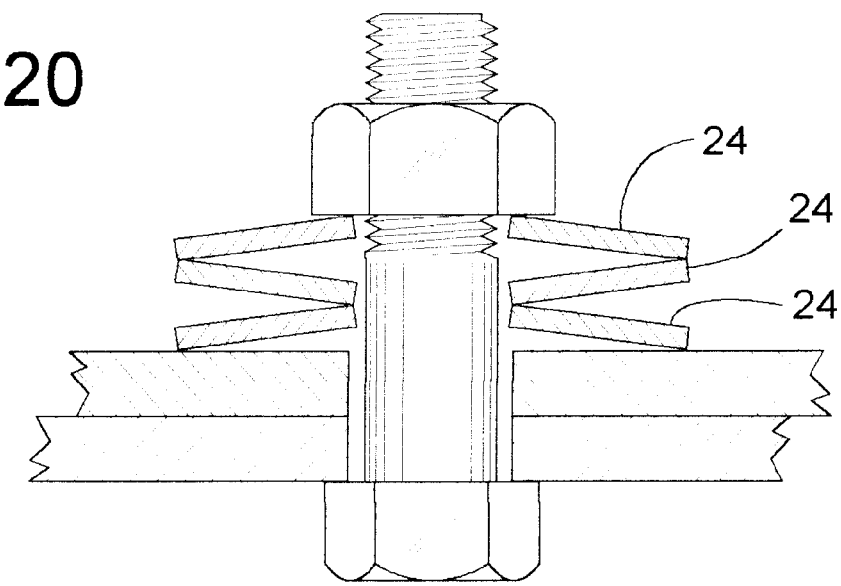
FIG. 20 is similar to FIG. 19, but with a set of discs stacked in such a way as to provide a lower spring rate.

The radial symmetry of disc 24 allows two or more discs to be stacked, as shown in FIG. 19. The expressions, "radial symmetry" and "radially symmetrical" describe a shape, wherein the entire shape can be divided into substantially identical pie pieces. Stacking discs 24 as shown in FIG. 19 allows the discs to resist an overall greater compressive force for a given amount of deflection. To achieve greater deflection for a given amount of compressive force, discs 24 can be stacked as shown in FIG. 20.

Although the invention is described with reference to a preferred embodiment, it should be appreciated by those skilled in the art that various modifications are well within the scope of the invention. Therefore, the scope of the invention is to be determined by reference to the claims that follow.

I claim:

1. A fastener, comprising: a disc elastically deflectable between an unstressed position of zero percent where a surface of the disc is bowed and a fully stressed position of a 100% where the surface is substantially flat, the disc has a thickness, an inner edge having a maximum radial point, and an outer edge having an effective outer diameter and a minimum radial point, wherein a center of gravity of the disc is at least as close to the minimum radial point as the center of gravity is close to the maximum radial point, the disc has a spring constant that is defined as a force needed to compress the disc to an intermediate position of 75% divided by a distance that the disc deflects upon moving from the unstressed position of zero percent to the intermediate position of 75%, wherein the disc has a coefficient of compliance greater than ten with the coefficient of compliance being defined as the thickness cubed divided by a product of the spring constant times the effective outer diameter squared, wherein the thickness is expressed in mils, the spring constant is expressed in pounds per inch, and the effective outer diameter is expressed in inches.

2. The fastener of claim 1, wherein the center of gravity of the disc is closer to the minimum radial point than to the maximum radial point.

3. The fastener of claim 1, further comprising a plurality of protrusions extending radially outward from the outer edge, wherein a distal edge of each of the protrusions defines the effective outer diameter of the disc.

4. The fastener of claim 1, wherein the disc is bimetallic in that the disc comprises two layers of material that have different coefficients of thermal expansion.

5. The fastener of claim 1, wherein the disc has a coefficient of compliance that is between 10 and 15.

6. The fastener of claim 1, wherein the disc is radially symmetrical.

7. The fastener of claim 1, wherein the thickness is less than 5% of the effective outer diameter.

8. The fastener of claim 1, wherein the inner edge further includes four substantially linear edges that lay in a substantially square pattern.

* * * * *